Figure 1:
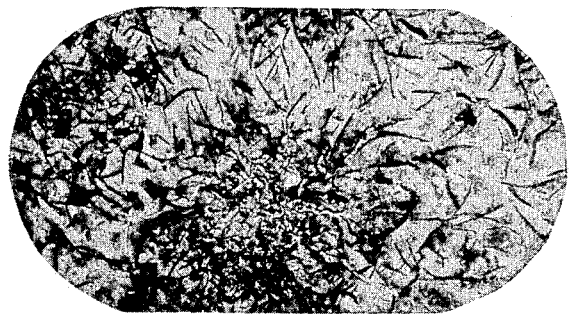

May 18, 1965    E. W. REINSCH    3,184,009
TORQUE TRANSMITTING AND/OR ENERGY ABSORBING DEVICE
Filed Aug. 16, 1962

INVENTOR.
Earl W. Reinsch
BY
His Attorney

United States Patent Office 3,184,009
Patented May 18, 1965

3,184,009
TORQUE TRANSMITTING AND/OR ENERGY
ABSORBING DEVICE
Earl W. Reinsch, Dayton, Ohio, assignor to General
Motors Corporation, Detroit, Mich., a corporation of
Delaware
Filed Aug. 16, 1962, Ser. No. 217,425
2 Claims. (Cl. 188—251)

This invention relates to a torque transmitting and/or energy absorbing device and is specifically directed to brakes, clutches and the like.

More particularly, the invention is directed to the combination of a sintered ferrous brake lining or facing used in conjunction with a brake member formed from iron substantially free from ferrite and wherein any graphite present is in nodular or spheroidal form.

An object of the invention is to produce a combination of elements for use in a torque transmitting and/or an energy absorbing device and particularly a brake wherein the uniformity of operation is improved.

In carrying out the above object it is a further object of the invention to reduce cold pedal effect normally present in automotive braking systems.

Further objects and advantages of the present invention will be apparent from the following description, reference being had to the accompanying drawings wherein preferred embodiments of the present invention are clearly shown.

Figure 2:
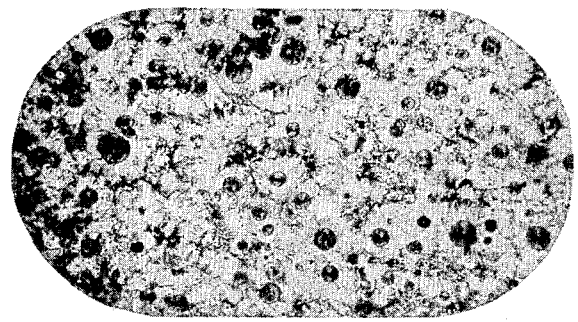

In the drawings:

FIG. 1 is a photo micrograph of a cross section of a conventional cast iron drum as commonly used in automotive vehicles showing the condition of the graphite therein, and FIG. 2 is a photo micrograph of a cross section of a nodular iron drum wherein the percentage of graphite is substantially the same as the percentage in FIG. 1 and wherein the graphite is in the spheroidized condition.

Recent trends in automotive design and improved road conditions have made possible higher speed travel in automotive vehicles. These trends have required improvement in brake design and construction so that the vehicles may be stopped within a safe distance even from the higher speeds. In order to make this condition possible, heavy duty brake lining materials have been developed which are metallic in nature and which will withstand the high temperature conditions which prevail in the brake during a stop or stops from high speeds. These temperature conditions are sufficient to, in many instances, cause charring of non-metallic type linings including organic type material. This new brake lining material which is specifically a sintered ferrous material including graphite, is disclosed in some detail in U.S. Patents 2,945,291 and 2,945,929, among others, which are assigned to the assignee of this application. These metallic friction materials have the ability to provide reasonably constant coefficients of friction over a wide range of temperatures and specifically are capable of maintaining the reasonably high coefficient of friction at high temperatures whereby the vehicle may be brought to a stop without excessive pedal pressure and wherein the friction material remains unharmed due to the rise in temperature.

These same materials, however, do not provide the ultimate in cold pedal operation under normal conditions. Cold pedal may best be defined as a reduction in effectiveness of the brakes after a period of inactivity, that is, when the automotive vehicle has been standing idle for a period of time, for example, over night, the first stop or first few stops made require greater pedal pressure to bring the car to a stop than do subsequent operations of the braking system. This condition, while not serious from a safety point of view, is nevertheless, annoying and has acted as a deterrent in some cases, toward the application of metallic brake linings in pleasure vehicles.

I have found that cold pedal conditions may be greatly lessened by utilizing a specific combination of elements in the braking system. Thus, when using a ferrous metal brake lining such as is disclosed, for example, in Patent 2,945,291, I have found that the cold pedal effects are greatly lessened if a nodular iron brake drum is used in combination therewith. Most automotive vehicles made today utilize gray cast iron brake drums. The combination of the metallic lining with the nodular drum reduce the cold pedal effect in the order of 25% whereby much better and more uniform operation is obtained from the braking system.

The only explanation for this improvement that can be offered is the change in shape of the dispersed graphite in the iron drum. When using a gray cast iron drum, the gray iron has graphite dispersed through the ferrous matrix in long strings or flakes. In the nodular iron drum the graphite is in the form of nodules or spheres and apparently this difference in the physical form of the graphite tends to reduce the effective area of graphite which has a marked effect on the cold pedal condition.

A typical cold pedal test procedure is as follows: the linings and drums are conditioned by making ten stops at ½ mile intervals each from 40 miles per hour at a deceleration rate of 10 ft./sec.$^2$. The vehicle is then parked for a minimum of two hours. The cold pedal is then evaluated by making ten stops at half mile intervals from 40 miles per hour at a deceleration rate at 10 ft./sec.$^2$ wherein the initial and final line pressures required to maintain the specific deceleration is recorded through each stop.

Using brake linings as disclosed in the aforementioned patent with a standard cast iron drum conditioning, the tenth stop of the schedule required 270 p.s.i. to produce the desired deceleration. After the car was parked for the two hour rest period from a forward stop, the first check stop after the cooling off period required an initial line pressure of 320 p.s.i., which may be termed the cold forward effectiveness. If the car was parked for the cooling off period from a reverse stop, the first check stop required initial line pressure of 385 p.s.i. This may be termed cold reverse effectiveness.

If the car is parked with a forward stop before the cooling period and a controlled reverse stop is made before the first check stop, the first check stop requires an initial line pressure of 385 p.s.i. This is also called the cold reverse effectiveness.

It will be noted that the line pressure increase to effect a specific deceleration to stop is the same to effect a stop if the immediate previous stop was a reverse stop, whether the reverse stop was before or after the cooling off period.

Thus, the difference between warm brake effectiveness at 270 p.s.i. and cold reverse brake effectiveness at 385 p.s.i. is 115 p.s.i. This difference will be detected by the driver and is known as hardened pedal. It occurs in normal driving when a driver backs out of a parking space and then is required to make a forward stop. The change in brake output is noted regardless of the car speed.

The same scheduled tests were made using nodular iron drums with all other conditions identical. In this instance the warm effectiveness dropped to 230 p.s.i., the cold forward effectiveness to 275 p.s.i. and the cold reverse effectiveness to 300 p.s.i. Thus, the nodular iron drum narrowed the difference between the warm stop and the cold reverse stop to 70 p.s.i. over the 115 p.s.i. required when using a gray cast iron drum.

In addition to the improved brake characteristics, nodular iron has greatly improved tensile strength over the usual gray cast iron. One useful grade of nodular iron is SAE type 2 80–60–03 which has a tensile strength in the order of 80,000 p.s.i. as compared to 30,000 p.s.i. for gray cast iron. Other grades of nodular iron are also useful providing that the iron has a matrix substantially free from ferrite. This is a very important consideration since free ferrite produces scoring tendencies and is not useful in braking applications.

Nodular iron offers another benefit that is commercially important, namely, due to the increased strength over gray cast iron, the drums may be made considerably lighter with decreased wall thickness without sacrificing ruggedness. Further, the increased strength permits integral casting of the drum with the front wheel hub which reduces costs while yielding improved braking operations.

In place of nodular iron, malleable iron is also useful providing it has substantially the same metallographic structure as the nodular iron and is within the same tensile strength range. Such malleable iron has the graphite in spheroidal form much as it occurs in nodular iron and is substantially free from ferrite and approaches nodular iron for the purpose at hand.

In general, sintered ferrous linings and/or facings having a sintered ferrous base and including graphite in quantities above 10% with or without well known friction fortifying and/or modifying materials, may be used effectively in the combination.

In general, a drum having a nodular graphitic structure when used in combination with a sintered, ferrous brake lining material will offer improved operational characteristics, particularly in the cold pedal range. Such improvements are easily noticeable by the operator of the vehicle and lessens the difference in pedal pressures required to bring a car to a stop under any given set of conditions.

It is to be understood that the principles involved are equally applicable to disc brakes, drum brakes, clutches and/or other torque transmitting and/or energy absorbing devices wherein sliding or rubbing engagement occurs between the several elements of the structure.

While the embodiments of the present invention as herein disclosed, constitute preferred forms, it is to be understood that other forms might be adopted.

What is claimed is as follows:

1. A brake for use in an automotive vehicle and the like, comprising in combination; a sintered ferrous brake lining and a braking surface cooperating with said lining, said braking surface consisting of nodular iron.

2. A brake for use in an automotive vehicle and the like comprising in combination; a sintered ferrous brake lining and a brake drum for use as a rubbing surface against said lining, said drum having its contacting surface consisting of nodular iron.

References Cited by the Examiner
UNITED STATES PATENTS

| | | | |
|---|---|---|---|
| 1,881,097 | 10/32 | Sargent. | |
| 1,900,804 | 3/33 | Crowe | 188—218 |
| 2,945,291 | 7/60 | Ankeny | 29—182.3 |

ARTHUR L. LA POINT, *Primary Examiner.*

EUGENE G. BOTZ, *Examiner.*